US005559936A

United States Patent [19]
Poulter et al.

[11] Patent Number: 5,559,936
[45] Date of Patent: Sep. 24, 1996

[54] DATA RETRIEVAL SYSTEM, DISPLAY APPARATUS AND METHOD OF RECORDING AND DISPLAYING

[75] Inventors: Graham G. Poulter, Leeds; Peter J. S. Ashley, Warrington, both of United Kingdom

[73] Assignee: On Demand Information International PLC, Leeds, United Kingdom

[21] Appl. No.: 708,738

[22] Filed: May 31, 1991

[30]     Foreign Application Priority Data

Jun. 6, 1990 [GB] United Kingdom ............... 9012601

[51] Int. Cl.⁶ .................................................. G06T 3/00
[52] U.S. Cl. ........................................ 395/128; 395/600
[58] Field of Search ............................ 395/128, 145, 395/147, 148, 153, 154, 155–161, 600, 133, 135, 139

[56]              References Cited

U.S. PATENT DOCUMENTS

| | | | |
|---|---|---|---|
| 4,533,951 | 8/1985 | Powers | 358/141 |
| 4,817,050 | 3/1989 | Komatsu et al. | 364/900 |
| 4,924,522 | 5/1990 | Bray et al. | 382/56 |
| 4,931,954 | 6/1990 | Honda et al. | 395/128 |
| 5,185,857 | 2/1993 | Rozmanith et al. | 395/148 |

FOREIGN PATENT DOCUMENTS 0311807   4/1989   European Pat. Off. .
2160057  12/1985   United Kingdom .

Primary Examiner—Almis R. Jankus
Attorney, Agent, or Firm—Ladas & Parry

[57]                 ABSTRACT

An interactive data retrieval system based on a personal computer is provided which comprises a database and a CD-ROM which is arranged to select and display visual images of product literature of interest to a user such as an architect for example. The database contains details of the illustrated products and the manufacturers of the products. A modem is provided to enable the user to communicate with the manufacturers of the displayed products and to receive updating information which is stored in the database. The display of a selected image may be aborted at any time by the user, and in order to facilitate comprehension of the image as quickly as possible whilst maximising the ultimate resolution of the image, the resolution of each displayed image is gradually increased during the display process. This is achieved by initially displaying the image in the form of blocks of identical pixels. The true image pixels at each position in the blocks are then substituted so as to enhance the resolution of the image. An arrangement for displaying an image which has been scanned at a spatial resolution which is different from the nominal spatial resolution of the monitor is also described.

29 Claims, 13 Drawing Sheets

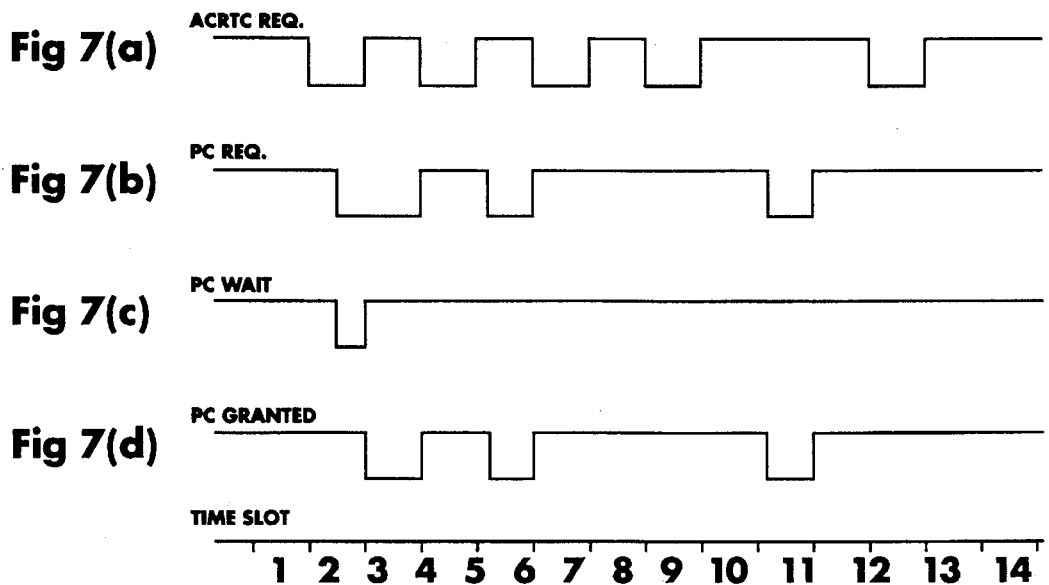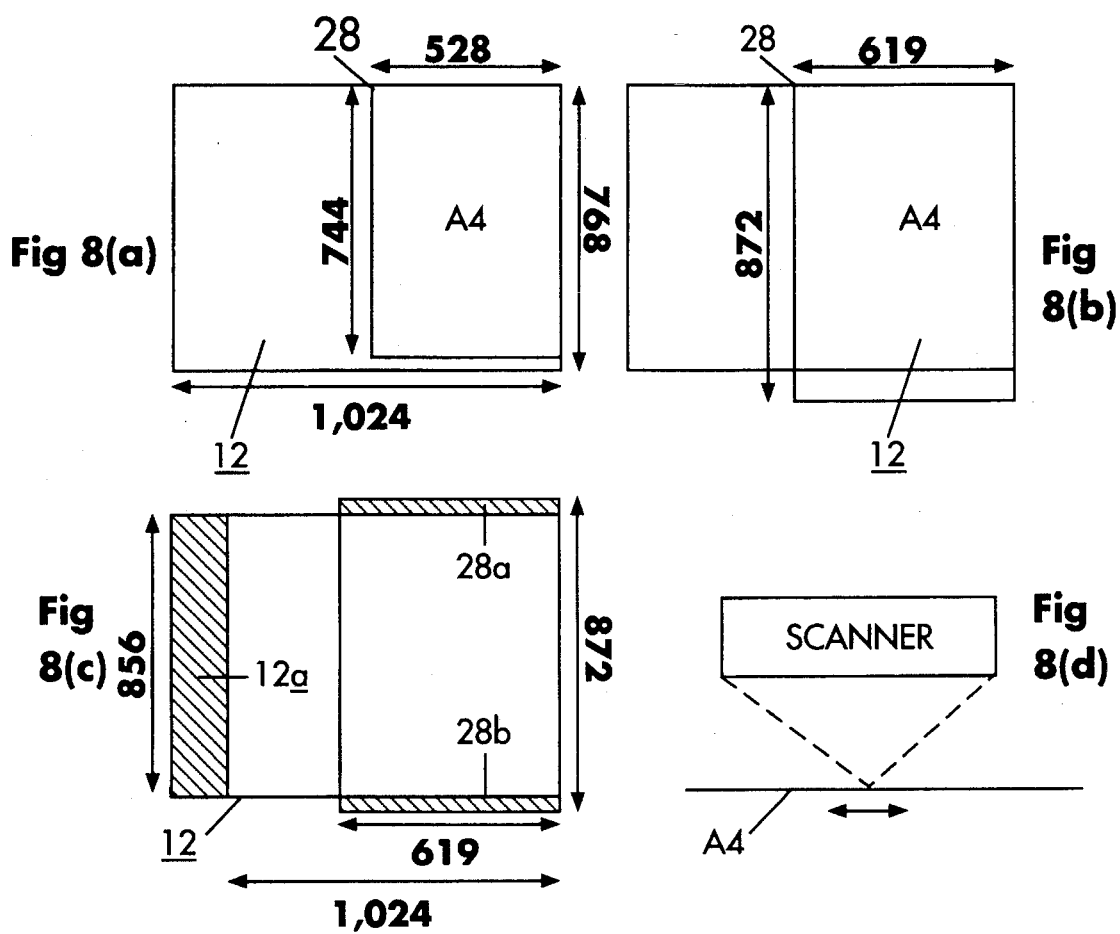

```
    QUANTARC  ELECTRONIC  LIBRARY
              PRODUCT INDEX
    basket strainers, sink
    basket wastepaper, domestic
    basket wastepaper, street & park
    batching plant
    bath mixers
    bath/showers taps
    bathing huts
  ▸ bathroom suites
    baths hospital
    baths public
    baths swimming
    baths swimming equipment
    baths turkish
    baths waste pipes
    baths, sauna public
    bats insulating
    battenboard

HELP        ALPHA SEARCH:        BROCHURE DETAILS        FINISH
```

Fig 10

```
         QUANTARC  ELECTRONIC  LIBRARY
              PRODUCTS/BROCHURES SELECTED

Product/Brochure              Manufacturer

DRAINAGE BELOW GROUND
  ♥ Channel Drainage          Wade International (UK) Ltd
  ♥ Floor Drains              Wade International (UK) Ltd INSULATION PRODUCTS, BOARDS
  ♥ Crown and Rocksil         Kitson Insulation Products
  ♥ Crown Pipe Insulation     Kitson Insulation Products
  ♥ Crown Slabs               Kitson Insulation Products PAVING EXTERNAL
  ♥ Nori Clay Pavers          Marshalls Mono Ltd
  ♥ Paving                    Marshalls Mono Ltd

HELP       C.D. SORT                        EDIT    FINISH
```

Fig 11

```
         QUANTARC  ELECTRONIC  LIBRARY
              PRODUCTS/BROCHURES SELECTED

Product/Brochure              Manufacturer

DRAINAGE BELOW GROUND
  ▸ Channel Drainage          Wade International (UK) Ltd
  ▸ Floor Drains              Wade International (UK) Ltd INSULATION PRODUCTS, BOARDS
  ♥ Crown and Rocksil         Kitson Insulation Products
  ♥ Crown Pipe Insulation     Kitson Insulation Products
  ♥ Crown Slabs               Kitson Insulation Products PAVING EXTERNAL
  ♥ Nori Clay Pavers          Marshalls Mono Ltd
  ♥ Paving                    Marshalls Mono Ltd

HELP       C.D. SORT                        EDIT    FINISH
```

Fig 12

```
        QUANTARC   ELECTRONIC   LIBRARY
                  MANUFACTURER'S INDEX
    Arkas Equipment Ltd
    Arken (UK) Ltd
    Arkinstall Cloakroom Equipment Ltd
    Arkinstall Galvanizing Ltd
    Arkrose Ltd
    Arkwright Architectural Aluminium
    Arlen Electronics Ltd
    Arm Marketing Ltd
    Armac Engineering Co Ltd
    Armadillo Products Ltd
    Armca Specialties Ltd
    Armco Construction Products Ltd
    Armes, R J & Sons Ltd
    Armfibre Ltd
  ► Armitage Shanks Ltd
    Armitage Shanks Ltd Engineering Division
    Armitage, George & Sons plc

HELP        ALPHA SEARCH:          PROD DTLS   MANUF DTLS   FINISH
```

Fig 14

```
        QUANTARC   ELECTRONIC   LIBRARY
                  MANUFACTURER DETAILS
 Name Armitage Shanks Ltd Address                    |       Products overview       |
 Armitage                   |                               |
 RUGELEY                    | BATHROOM SUITES               |
 Staffordshire              | Clarendon Range               |
 WS15 4BT                   | Dolphin Range                 |
 England                    | Vanity Units                  |

Phone 0543 490253
 Fax   0543 491677
 Telex 339781

Contact
 Mr K Hancock
 Job Title
 Marketing Director

HELP         PRINT   NEXT   TO INDEX              FINISH
```

Fig 15

```
        Q U A N T A R C   E L E C T R O N I C   L I B R A R Y
                        Sfb CLASSIFICATION
    (82)        office furniture & fittings
    (82)        printing machines drawing office
    (82)        reprographic equipment
    (82)        safes office
    (82)        seats office
    (82)        shelves & shelving office
    (82)        storage, bulk office
    (82)        telephone kiosks, internal
    (82)        typewriting & typewriters
    (82)Abb     abattoir fittings and equipt
    (82)bank    bank safes, fittings, screens
    (82)bank    night safes
    (82)bank    safes security
    (82)bank    strong rooms
    (82)bank    wall safes
    (82)int     office landscaping services
    (82)int     plant displays, interior

HELP        ALPHA SEARCH:         PRODUCT DETAILS      FINISH
```

Fig 16

```
        Q U A N T A R C   E L E C T R O N I C   L I B R A R Y
                         TRADE NAME INDEX

NIL-SPORE
      VIC-VAC
      'S' RANGE
      'T' GRADE SEAL
      'T' SERIES
      'T' VENTS
      004 SECURITY FILM
      10 STRIP
      1040 SLIDING
      1890's
      1ST THERMAL (USA)
      200 SERIES
      2000
      2200 ANTISTAT
      2200 RD
      24 HOUR
      2L2

HELP        ALPHA SEARCH:         BROCHURE DETAILS     FINISH
```

Fig 17

```
        Q U A N T A R C   E L E C T R O N I C   L I B R A R Y
                             JOB FILE
   CLIENT Leeds City PROJECT Headingley Centre Product/Brochure        Manufacturer                Mess    Date
                                                       Sent
   INSULATION
   Crown and Rocksil       Kitson Insulation Products
   Crown Pipe Insulation   Kitson Insulation Products   1

DRAINAGE
   Channel Drainage        Wade International (UK) Ltd  4

PAVINGS
   Nori Clay Pavers        Marshalls Mono Ltd           2

BATHROOM SUITES

HELP      PRINT   FILE   FILE & MESSAGES   MESSAGES     FINISH
```

Fig 18

```
         QUANTARC    ELECTRONIC    LIBRARY
                    BUILDING REGULATIONS

Building Regulations Index                          Page

INTRODUCTION                                               2
    Do The Building Regulations apply?                         3
    Which procedure to follow if The Building Regulations apply
    Meeting the requirements of The Building Regulations       5

SECTION 1
    The application of The Building Regulations                6

SECTION 2
    The Two systems of building control                        7

A LOCAL AUTHORITY CONTROL                                  7
    Deposit of plans                                           7
    Certificates of compliance                                 8
    Building in accordance with plans                          8

HELP                                              VIEW   FINISH
```

Fig 20

```
         QUANTARC    ELECTRONIC    LIBRARY
                    REVIEW SENT MESSAGES

MESSAGES SENT
                          Manufacturer            Mess    Date
    INSULATION                                    Sent
    Crown and Rocksil       Kitson Insulation Products    2    30/5/90
    Crown Pipe Insulation   Kitson Insulation Products    3    30/5/90
    DRAINAGE
    Channel Drainage        Wade International (UK) Ltd   4    30/5/90
    PAVINGS
    Nori Clay Pavers        Marshalls Mono Ltd            1    30/5/90
    BATHROOM SUITES
    Clarendon Range         Armitage Shanks Ltd           1    30/5/90

HELP                                                      FINISH
```

Fig 21

DATA RETRIEVAL SYSTEM, DISPLAY APPARATUS AND METHOD OF RECORDING AND DISPLAYING

BACKGROUND OF THE INVENTION

The present application relates to an interactive data retrieval system, to display apparatus which is suitable for use in such a system, to a digital recording medium which is suitable for use in such a data retrieval system and data display apparatus, and to a method of recording and displaying a still visual image which can be carried out by such a data retrieval system or display apparatus. The present invention relates particularly but not exclusively to such a system, apparatus, recording medium and method when used to handle color images or manufacturers product literature. For example, it is envisaged that such an electronic library will enable architects, quantity surveyors and others to obtain up to the minute information of the products and services offered to the construction industry by manufacturers and suppliers.

One of the main factors which has inhibited the use of electronic data retrieval systems handling color images has been the slow retrieval and display of such images, even when the images are read from a digital recording medium such as a CD-ROM. The various aspects of the present invention are each directed to increasing the speed and/or resolution with which a recorded image (particularly a color image) can be displayed.

SUMMARY OF THE INVENTION

According to one aspect this invention there is provided an interactive data retrieval system for selectively retrieving and displaying stored visual images, characterised by a) a recording medium having a multiplicity of visual images recorded thereon;

b) playback means arranged to access and read said visual images from said recording medium;

c) memory means containing a plurality of stored data fields, the data in at least one of said data fields identifying said visual images and the data in at least one other of said data fields being associated with said visual images and relating to users or suppliers of products or data shown in said recorded visual images;

d) database program means in association with a microprocessor for enabling a user to access data in said data fields and said visual images read by said playback means;

e) display means arranged to display under the control of said database program means, said visual images and other data accessed by a user; and f) an electronic data communications link between the user specified in subparagraph d) and a master database source, or one or more remote users or suppliers of said products or data shown in said recorded visual images. Such an interactive data retrieval system may be implemented, for example using a high speed personal computer equipped with CD-ROM drive and a high resolution color monitor.

The stored visual images may for example show products or data (such as the building regulations for example) available to the construction industry and the stored data associated with the visual images may include manufacturers and suppliers of the products as well as a list of the products and other details appropriate to the construction industry such as the Sfb classification of the products.

Conveniently two display means are provided, one, which may be mono for viewing data in said data fields and another, preferably said color monitor for viewing said visual images.

By associating the stored database with the stored visual images the system enables a user such as an architect for example to decide very rapidly which available products would be most suitable for use in any given project. It is envisaged that such a system would be useful not only for architects and other professionals in the construction industry, but for any users of products whose visual appearance is important, or in general as an electronic library.

Such a system has the further advantage that the images of the products literature (which may be stored on CD-disk for example) can be updated very quickly and new CD's can be distributed to the users.

In order to enable a user to obtain more information about any products accessed by the database and displayed on screen, the data retrieval system preferably comprises an electronic data communications link between the local user and a master database source, or one or more remote users, or suppliers of the products or data shown in the recorded visual images.

Preferably, the memory means is arranged to store updating information received via said communications link and relating to a displayed visual image, and said display means is arranged to display said updating information in association with its associated visual image.

Since it will typically take several seconds to display a color image at 75 d.p.i. resolutions of A4 size, the display means is preferably arranged to display each stored visual image selected by the user with a gradually increasing resolution and means are provided for enabling the user to cancel the display of a selected visual image at a stage intermediate the initial relatively low resolution and the final relatively high resolution. For example, the display may be controlled by a mouse or other pointing device and the user may cancel a visual image as soon as it is displayed with a sufficient resolution to enable him to decide that the product shown is of no interest. In this manner, the information retrieved from the recording medium, and hence the display time of each image, are both optimised.

Accordingly, in a second aspect the invention provides apparatus for displaying a still visual image in the form of a multiplicity of pixels, comprising means for dividing the image into square groups of adjacent pixels, means for replicating a predetermined pixel within each group by the other pixels in that group to form a relatively low resolution image composed of groups of identical adjacent pixels, means for substituting the true image pixels for said other pixels in each group to form a relatively low resolution image composed of individual pixels, and display means responsive to said replicating means and substituting means to display an image of increasing resolution. It should be noted that such display apparatus may be used in applications other than a data retrieval system in accordance with the first aspect of the invention and that the data retrieval system may utilise other techniques for displaying a still visual image with gradually increasing resolution. For example the data retrieval system may be arranged to display a black and white image initially, and to subsequently add color to this image.

In the above-mentioned display appratus, the substituting means is preferably arranged to substitute the true image pixel for a predetermined one of said other image pixels in each group simultaneously. For example, in a preferred embodiment which is described in detail below, each group comprises a 2×2 array of four pixels, the top left-hand pixel is initially replicated within each group and the substituting means first substitutes a true pixel for the bottom right-hand pixel of each group simultaneously, then substitutes a true pixel for the top right-hand pixel of each group simultaneously and finally substitutes the true pixel for each bottom left-hand pixel of each group simultaneously.

Although it will normally be convenient to arrange for each predetermined pixel which is replicated within its group to have the same relative position with respect to the other pixels in its group, for example the top left-hand position in a 2×2 array, display apparatus in which these pixels have different relative positions within their respective groups (for example a random or pseudo random relative position) is also within the scope of the invention.

However, in order to enable the preferred display apparatus of the invention to access the pixels in the order in which they are displayed within their respective groups, a feature of the invention provides a digitial recording medium having a visual image recorded thereon as groups of pixels, the pixels within each group being adjacent on the recording medium and spaced apart in the visual image such that each pixel belonging to a given group on the recording medium forms part of a group of adjacent pixels of the image and has a predetermined relative position with respect to the other pixels of said group of adjacent pixels of the image. For example, in a preferred embodiment which is described in more detail below, the recording medium has a group of "top left-hand" pixels adjacent a group of "bottom right-hand" pixels which is adjacent a group of "top right-hand" pixels which in turn is adjacent a group of "bottom left-hand" pixels. Such a recording medium is useful in a display apparatus in 35 accordance with the second aspect of the invention in which the dislayed image is initially divided into groups of four pixels (each in the form of a 2×2 array), the "top left-hand" pixels from the recording medium being read into the top left-hand positions of respective 2×2 arrays and replicated in the remaining three pixels of their respective arrays, and then the "substituting means" substitutes firstly the correct "bottom right-hand" pixels in each 2×2 array, then the "top right-hand" pixel in each 2×2 array and finally the "bottom left-hand" pixel in each 2×2 array.

Typically, it will be desirable to display an A4 image life size in a data retrieval system or display apparatus in accordance with the present invention. However, A4 high resolution color monitors are not commercially available and the problem arises of how best to display such an image on a commercially available color monitor, such as for example a 508 mm (20 inch) color monitor. Furthermore, the pixel size produced by a color scanner will normally be different from the pixel size which a color monitor is adapted to display, and although commercially available scanners may be arranged to scan at predetermined, different, resolutions, this process involves discarding pixels. It has been found that if such a scanned image is displayed on a color monitor then a deterioration in the image quality occurs and in particular, Moiré patterns may be produced.

In order to alleviate the above disadvantages, in a third aspect the present invention provides a method of recording and displaying a still visual image comprising scanning the image with a scanner, recording the scanned image on a recording medium, reading the image recorded on said recording medium and displaying the image by means of a cathode ray tube, wherein the image is scanned at an integer submultiple of the maximum resolution of the scanner, the scanned image being represented by a multiplicity of pixels, and the number of horizontal lines displayed by the cathode ray tube is selected such that there is a one to one correspondence between the horizontal lines and the rows of pixels generated by the scanner.

Preferably the picture width and/or the number of horizontal pixels displayed by the cathode ray tube is adjusted so that the aspect ratio of the displayed image is substantially the same as the aspect ratio of the scanned image.

For example in a preferred embodiment described below, a commercially available color monitor is normally arranged to display images with a pixel size of 0.396 mm (1/64th of an inch) whereas the scanner is arranged to scan at a resolution of 75 dots per 25.4 mm (75 d.p.i.), corresponding to a pixel size of 0,339 mm. An A4 image scanned at 75 d.p.i. would not fit on the screen if the normal number of horizontal lines were employed. Accordingly, the image is scanned at 75 d.p.i., the number of horizontal lines displayed by the color monitor is increased so as to fit virtually the full height of the document onto the screen, and the picture width displayed by the color monitor is reduced so as to restore the aspect ratio of the document, i.e. so as to ensure that the image displayed has square pixels like those formed by the color scanner.

BRIEF DESCRIPTION OF THE DRAWINGS

The invention will now be described by way of example with reference to the accompanying drawings, in which:

FIGS. 7(a) to (d) show timing diagrams associated with the graphics controller of FIG. 6;

FIGS. 8(a) to (c) illustrate the display of a still visual image by the data retrieval system of FIG. 1 from a scanner shown in FIG. 8(d), the method of recording and displaying the still visual image being in accordance with the fourth aspect of the invention;

FIG. 10 shows an alphabetical list of products;

FIG. 11 shows a screen of products selected and appropriate manufacturers;

FIG. 12 shows the CD-ROM on which the product information is available;

FIG. 14 shows an alphabetical list of product manufacturers;

FIG. 15 shows a screen of details of a particular manufacturer;

FIG. 16 shows a screen of Sfb Classification;

FIG. 17 shows a screen of a trade name index;

FIG. 18 shows a screen of a job file index;

FIG. 20 shows a screen of image data; and

FIG. 21 shows a screen of mail management.

In the Figures like reference numerals denote like parts.

DESCRIPTION OF PREFERRED EMBODIMENTS

Figure 1:
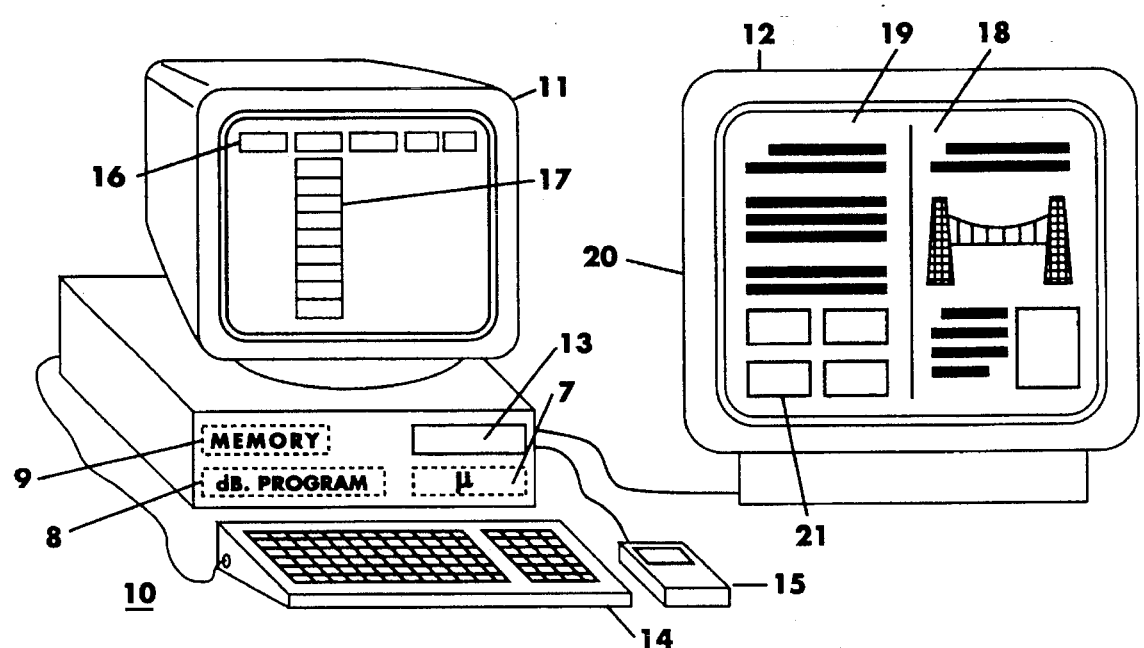
FIG. 1 shows a personal computer (PC) based interactive data retrieval system in accordance with the first aspect of the invention.

The data retrieval system shown in FIG. 1 uses an IBM PC/AT compatible computer 10 using an INTEL 80386 SX microprocessor 7. The computer includes a 100 megabytes fast access hard disc 9 and a Phillips (Registered Trade Mark) CD-ROM drive 13. In addition to a conventional relatively low resolution black and white (monochrome) screen 11, the computer includes an additional 20 inch (508 mm) high resolution color screen 12 which is controlled by a dedicated graphics controller (not shown) which is fitted into one of the expansion slots of the computer.

The CD-ROM drive 13 accepts CD-disks containing stored monochrome and color images of manufacturers product literature such as brochures and the like and the computer is loaded with a graphics program which controls the display of these images, one of which is shown in the right-hand half (region 18) of screen 12. Additionally the computer is loaded with a commercially available "Fox pro" database program 8 which has been modified to accept control with a mouse 15, as well as with a conventional key-board 14. The database program enables a user to organise, index, retreive and display (on mono screen 11) data stored in the database on hard disc. The database consists of manufacturers details (company name, address, telephone, etc.), products details (product categories), brochure details (brochure name, number of pages and details of the block locations of the images stored on the hard disc), and SfB category details. The SfB classification system is a widely accepted classification of products used in the construction industry.

Figure 2:
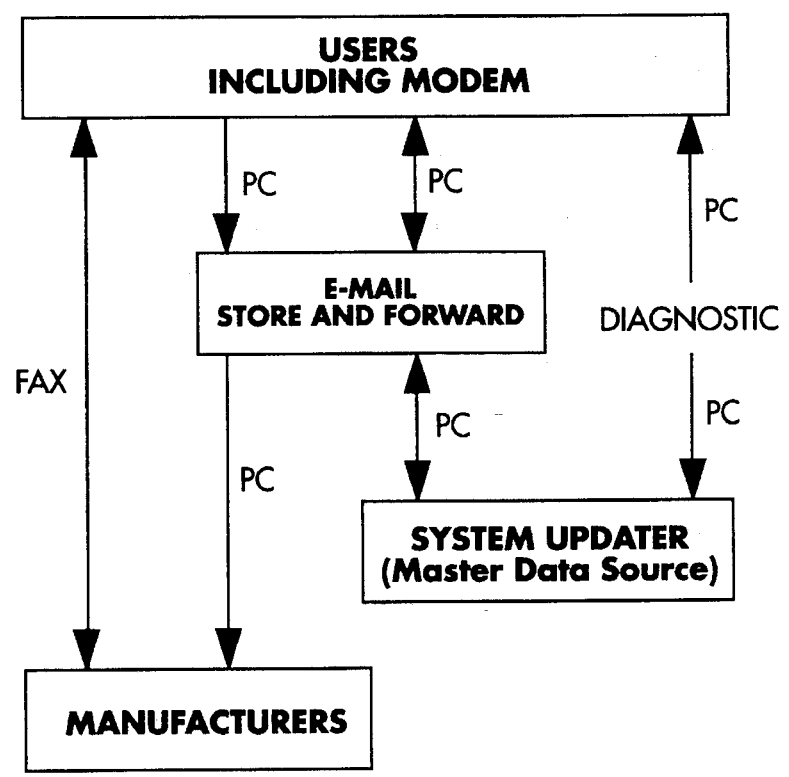
FIG. 2 is a diagram illustrating the communications between the users of the interactive data retrieval system shown in FIG. 1.

Additionally the computer 10 incorporates a modem facility in one of its expansion slots. As shown in FIG. 2, this facility enables users of the system to communicate via an electronic mail box such as E-Mail with manufacturers of the products depicted in the brochure images.

Additionally, as shown in FIG. 2, the modem enables a system updater (or master data source) to communicate with a user of a system as shown in FIG. 1 and with other users of similar systems utilising the same database and set of stored brochure images on CD-ROM. Finally, the modem enables diagnostic messages to be sent between the various users and the system updater directly without recourse to any electronic mail box. As shown in FIG. 2, it is also assumed that the users and manufacturers can communicate by fax, quite independently of the data retrieval system.

The initial installation takes place at the time each system is commissioned. Thereafter it can be updated in one of three ways:

a) By an engineer on-site connecting an extra floppy disk drive to the system and transferring the updates;

b) When a new set of CD's are issued containing images; part of one CD could be used to store the latest copy of the database;

c) All the hard disks may be updated by the E-Mail system when users "log-on", e.g. automatically at night, i.e. users need not be present or even aware of the update.

The database also contains references to the brochure images which are stored digitally on video CD-ROM disks. User systems may have a large number of CD's containing tens of thousands of brochure images. Each image is a page of an A4 brochure but may be other desired sizes.

Referring again to FIG. 1, it will be seen that screen 11 displays various headings 16. These are as follows:
SELECT INDEX
NOTICE BOARD
MAIL MANAGEMENT
HOUSE-KEEPING
FINISH The database program is modified to accept control from mouse 15 or another pointing device and accordingly, when a user clicks on one of headings 16 a pull-down menu such as those shown at 17 appears on screen 11 which contains further options which can be selected by the user, using the mouse. The SELECT INDEX menu is as follows:
PRODUCT INDEX
MANUFACTURER INDEX
TRADE NAME INDEX
SfB CLASSIFICATION
BUILDING REGULATIONS
JOB FILE The JOB FILE option, when selected, calls up a screen which lists image selections initially viewed, that can be saved, messages sent and received and other action taken in connection with any enquiry resulting from the particular file. The BUILDING REGULATIONS options calls up a series of screens in which relevant information on the building regulations is presented. The remaining options in the SELECT INDEX menu each call up a series of screens listing manufacturers or products according to the relevant classification. These screens in turn each incorporate further options which can be selected by the user using the mouse, including the possibility of calling up images of the brochure pages on section 18 of screen 12.

In this manner, visual images of the products and other product information can be accessed using the various indices provided by the database and the products which are potentially of interest can be grouped together in a job file for further action such as sending an enquiry to the manufacturer. A zoom facility is preferably provided whereby the visual image of a brochure page, which normally occupies part of the viewed screen, may occupy the whole screen. In order to simulate turning the pages of a brochure, the bottom left-hand portion 20 of screen 12 is provided with various icons 21 which can be clicked on using the mouse to select visual images corresponding to different pages of the brochure, for example. The top left-hand portion 19 of screen 12 displays product updating information relating to the products displayed in the visual image on the screen and such information can be transferred to the database hard disk remotely via the modem. In this way, the database system can be updated whilst CD's are being updated to show the latest products.

Information concerning new products and other information of interest to the user can be selected by clicking on the NOTICE BOARD heading on screen 11.

In this manner, architects and others can access reliable, up-to-date information about products likely to be useful in any particular project. The disadvantages associated with product literature in the form of hard copy, namely large amount of storage space, missing or out-of-date information, only one user can view a document at any one time, and difficult access to the required information are thereby avoided. However if hard copy is required, the software enables a user to print out a copy of the image shown in screen portion 18 on a printer known per se (not shown) which may be a color laser printer connected to computer 10.

Hitherto, a disadvantage which has tended to hinder the acceptance of database systems handling color images has been the slowness of retrieval and display of reasonably detailed color images, even using a relatively high speed personal computer. In order to alleviate this problem, the interactive data retrieval system of FIG. 1 includes a modification to CD-ROM drive 13, which is described below with reference to FIGS. 3, 4 and 5.

Figures 3, 4:
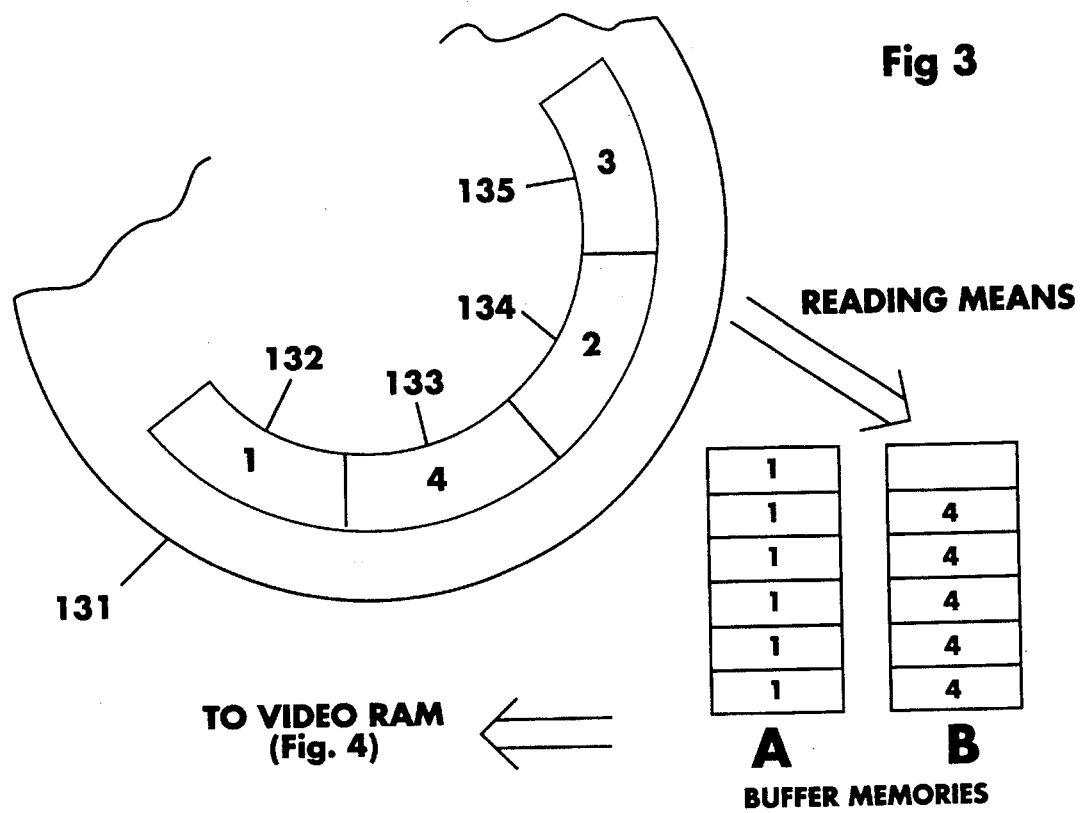
FIG. 3 shows schematically an optical recording medium in accordance with the feature of the invention.
FIG. 4 shows schematically the memory arrangement of a video RAM which is incorporated in the data retrieval system of FIG. 1 and which utilises the recording medium of FIG. 3.

FIG. 4 shows schematically a video RAM 22 which is used to store image pixels read from the CD's by the CD-ROM drive 13. The RAM is divided into a 310×428 array of groups of 4 pixels, each group being in the form of a 2×2 array. The pixels shown in the groups can be considered to map onto the pixels displayed in region 18 (FIG. 1) of the display so that group 1,1 as shown in FIG. 4 occurs at the top left-hand corner of the display, group 310, 1 occurs at the top right-hand corner of the display, group 1, 428 appears at the bottom left-hand corner of the display and group 310, 428 appears at the bottom right-hand corner of the display.

Initially however the video RAM 22 is not filled with pixels in positions 1, 2, 3 and 4 as shown in FIG. 4. Instead, all the pixel 1 positions are loaded first and as each pixel is loaded it is copied into positions 2, 3 and 4. For example, if screen pixel 101,101 is a number designated to be red, then on the first pass of the image load, pixels 102, 101, 101, 102 and 102, 102 also become red.

The visual effect of this is that the screen is filled very rapidly with a low resolution version of the final image. As the user assimilates this image, passes 2, 3 and 4 of the load take place.

On pass 2, all the pixel 4 positions are loaded onto the screen overwriting whatever values pass 1 set them to. Thus in each pixel quad, after pass 2, the 2 diametrically opposed pixels of each group contain the correct eventual image information, i.e. the image now contains twice as much visual information as after pass 1. On pass 3, all the pixel 2 positions are loaded onto the screen overwriting their original values—and on pass 4, all the pixel 3 positions are overwritten completing the final image. All 530, 720 individual pixels of a 620×856 image have now been loaded and the image is now complete.

The purpose of this loading method is as follows: if loaded in a single pass, as is conventional, the user sees a gradual filling of the screen from top to bottom. This takes with current technology about 7 seconds, (i.e. slow to the eye) and if the user were to abort this load when he finally realised that this was not the required image, then a half filled screen would result.

The 4-pass load method of this invention delivers the first whole-screen image (albeit slightly blurred—or low-resolution) in about 1.75 seconds, subsequent passes taking slightly longer. This image should be instantly recognisable as the human brain is excellent at filling in the missing information. This low-resolution image is then sharpened up over the next 3 passes of the load—and the total image load time then becomes 7.5 seconds, i.e. there is a half-second overhead for using this method over the whole image but the user has an earliest opportunity to abort the load and preceives that the image has been loaded in a much smaller timeframe.

This process is illustrated schematically in FIG. 5, which shows a small portion of the displayed image 18 as it is built up by the above process. It is assumed that the final image as shown in FIG. 5 (d) all the pixels in the group of concern have different colors, shown by different forms of cross-hatching. In the first pass all the pixels 1–4 of the group are given the color, saturation etc. of pixel 1. The group of 2×2 pixels thus appears in the first pass as illustrated in FIG. 5 (a).

In the next pass, the replicated pixel in position 4 is given its true color, saturation etc. as shown in FIG. 5 (b).

In the third pass, as shown in FIG. 5 (c), the correct pixel is written into position 2 of the 2×2 array.

Finally, the true pixel is substituted in position 3 of each 2×2 array as shown in FIG. 5 (d). Thus the user initially sees a slightly blurred picture which his eye-brain combination assimilates as additional detail at each successive pass.

In this invention, the CD-ROM drive 13 and CD-disks 131 (FIG. 3) are modified in order to facilitate the above process.

In a conventional CD-ROM drive, data is read from a spiral track on the CD into two sector buffers at a rate of 153 kilobytes per second. These hardware buffers each hold 2 kilobytes of data, and conventionally the data is fed alternatively into one and then the other buffer. This process occurs blindly on a time slice basis. The driver then empties these buffers as fast as possible, delivering the data to the user application.

Figure 5A:
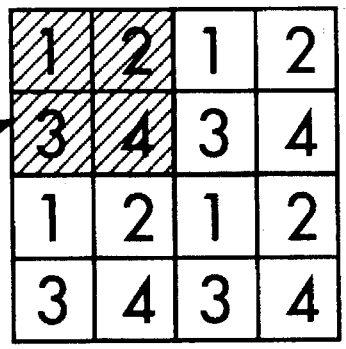
FIG. 5(a)–5(d) are diagrammatic representations of the build-up of an image by a display system in accordance with the second aspect of the invention which utilises the recording medium of FIG. 3 and the video RAM arrangement of FIG. 4.
Figure 5B:
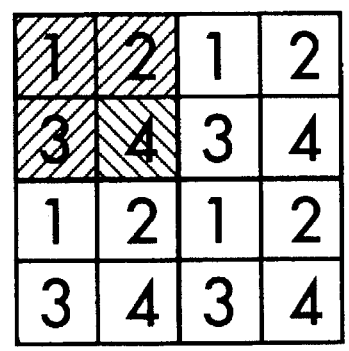

However with the present invention, a first hardware buffer (labelled A in FIG. 3) is filled with all the pixels having position 1 in the 2×2 arrays of pixels which constitute the displayed image. These pixels are then copied to video RAM 22 as shown in FIG. 4 and are replicated in positions 2, 3 and 4 of each 2×2 array 220 as described above. The crude image thus formed (as shown in FIG. 5(a) for example) is immediately displayed. Simultaneously, the pixels corresponding to position 4 of each 2×2 array are read into a second sector buffer B (FIG. 3) and as soon as this buffer has been filled 5 and buffer A has been emptied, these pixels are read into position 4 of video RAM 22 as shown in FIG. 4. At this stage, each 2×2 array of video RAM 22 has the true image pixel at position 1 replicated at positions 2 and 3 and further has the true image pixel at position 4. At this stage, the contents of video RAM 22 are written to the screen to form a display as shown in FIG. 5(b).

Figure 5C:
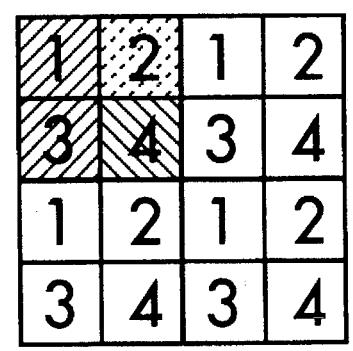

Whilst buffer B is being emptied of the pixels of position 4, buffer A is being filled with pixels of position 2 which are read from the CD 131. When buffer A has been filled with the pixels at position 2 and 15 buffer B has been emptied, the pixels of position 2 are read into the appropriate positions of each 2×2 array of the video RAM 22 whilst buffer B is filled with pixels of position 3 which are read from the CD 131. When all the pixels in position 3 have been inserted in video RAM 22, the contents of this RAM are displayed to show an image as shown in FIG. 5(c).

Figure 5D:
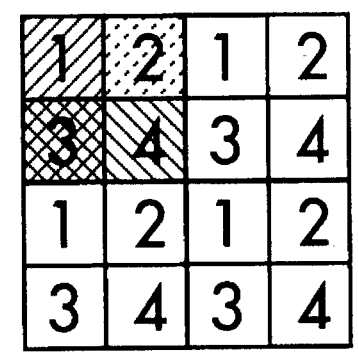

Finally, the pixels of position 3 stored in buffer B are substituted into the position 3 of each 2×2 array in video RAM 22 and the contents of the RAM (which now comprise the correct image pixels in positions 1, 2, 3 and 4 of each 2×2 array) are displayed to form the final high resolution image as shown in FIG. 5(d).

In order to facilitate this process the pixels of position 1 are recorded in a leading portion 132 of a recorded track on the CD (shown greatly exaggerated in size for the sake of clarity), followed by the pixels of position 4, the pixels of position 2 and the pixels of position 3 in portions 133, 134 and 135 as shown in FIG. 3.

Contrary to usual practice, the visual image data stored on the CD is not compressed in any way. By avoiding compression, the resulting loss of speed associated with decompressing the image is avoided, although compression may be used if desirable.

In order to enable a user to abort the display of any image as soon as he has realised that the image is not wanted, the software checks whether there has been an interrupt from the mouse drive (i.e. whether a mouse button has been pressed and released) after each line of the display has been loaded. If such an interrupt is detected, the loading process is aborted.

Images are stored in two ways on the CD depending upon their color content as decided at the scanning stage. If the image is notabsolutely color critical then 1 byte per pixel is used, i.e. each dot in the image points to one of 256 palette entries containing values for red, green and blue (256 levels of red, green and blue). Each pixel can therefore be one of 256 colors from a palette of 256×256×256=16.7 million.

If the image is color critical then two bytes per pixel are used with no palette. 5 bits are used for red, 5 for blue and 5 for green (1 bit spare from the 2 bytes= 15 bits). In this case the image takes up twice the space on disk and one byte per pixel method.

The palette is stored with each image on the CD.

The display of the image read from the CD's by the CD-ROM drive 13 is controlled by a dedicated graphics controller in the form of a 16 bit high resolution graphics card which is fitted into one of the expansion slots (not shown) of the computer 10 (FIG. 1). The block schematic diagram of this graphics controller is shown in FIG. 6 and its construction and operation will now be described with reference to FIGS. 6 and 7.

Figure 6:
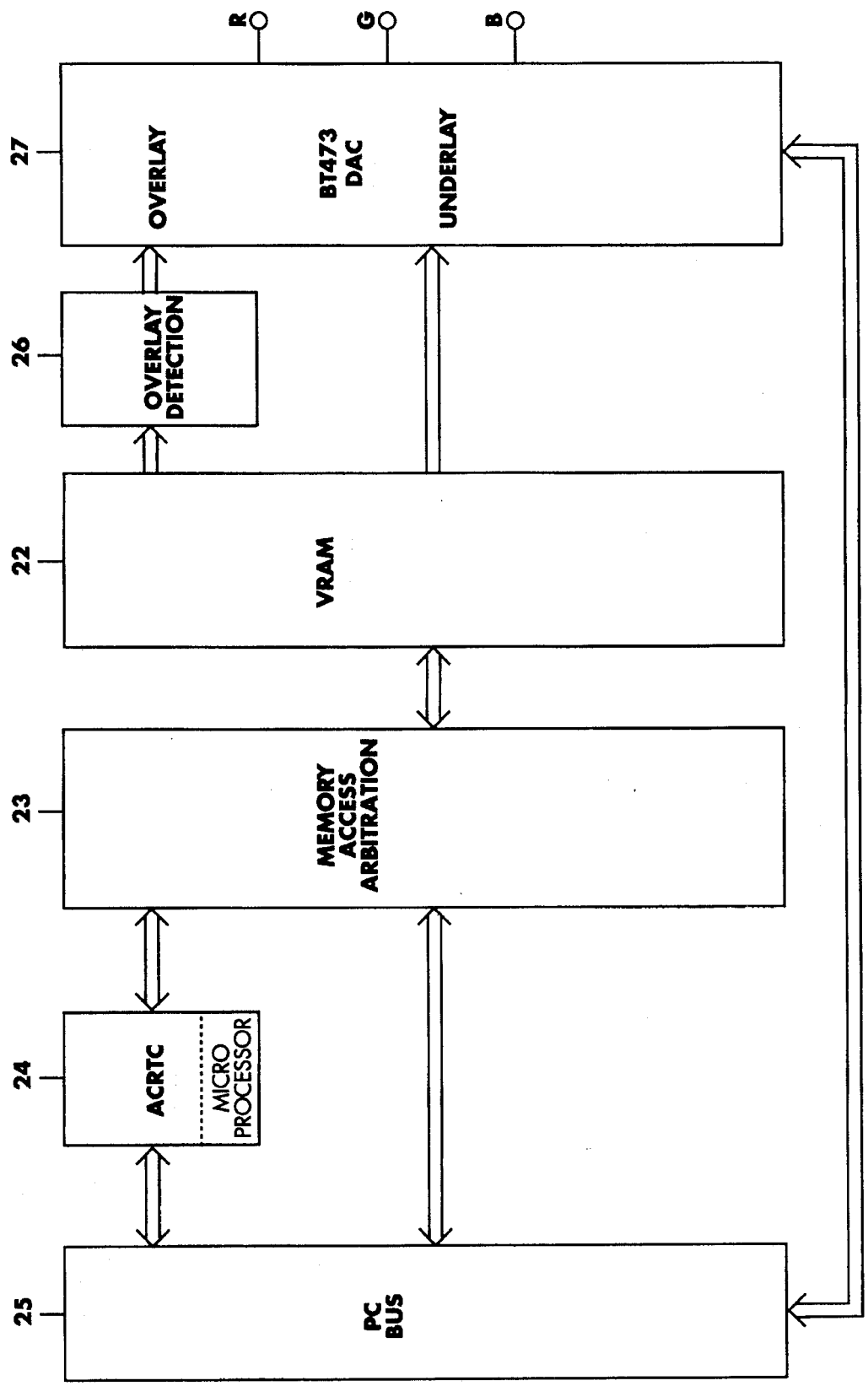
FIG. 6 is a simplified schematic block diagram of a dedicated graphics controller utilised in the data retrieval system of FIG. 1.

As shown in FIG. 6, the graphics controller comprises video RAM 22 (whose function and organisation has already been described with reference to the schematic representation in FIG. 4), which is coupled via a memory access arbitration chip 23 directly to the computer bus 25 and also to an advanced cathode ray tube controller chip (ACRTC) 24. Video RAM 22 is also connected to a digital to analogue converter 27 which generates the required red, green and blue signals for the display unit 12 (FIG. 1). An overlay detection unit 26 is connected to a port of video RAM 22 and to the digital to analogue converter (DAC) 27. The overlay detection performed by this unit and also the underlay detection will not be described in detail since these functions are well known per se. These functions are however associated with the menus and any other graphic symbols such as icons 21 (FIG. 1) displayed by display unit 12.

The various blocks shown in FIG. 6 are desbribed below in more detail.

Video memory 22

The 2 Mb of video memory is implemented using dual port video memories. These devices allow drawing and display update to occur simultaneously with the display of the image on the screen. One of the ports is used by the ACRTC or PC to read or write data into the memory, whilst the 20 other is used to read data from the memory to supply the DAC 27.

The memory is arranged in a 1024 by 1024 array, with each pixel being 16 bits deep. Any portion of the 1024×1024 array may be displayed on the screen, although normally the resolution would be 1024×768.

Digital to analogue converter 27

This device is a Brooktree BT473 chip, which converts the 16 bits of data from the video memory into the analogue red, green and blue (RGB) signals required to drive the monitor 12. The data can be used in 3 different ways to generate a picture on the screen, and these modes of operation are as follows:

1. 15 bit true color mode.

In this mode, bits 0–4 are used to generate the blue output, bits 5–9 generate the green, and bits 10–14 generate the red. Using this mode, up to 32768 different colors may be displayed on the screen at any one time.

2. 8 bit color using a look up table.

In this mode, bits 0–7 are used to address a color look up table. Each look up table entry contains a programmable "palette' of red, green and blue values. Using this mode, 256 different colors from a palette of 16.7 million possible colors can be displayed at any one time.

3. 4 bit overlay using a look up table.

This mode is used in conjunction with either the 8 or 15 bit modes. If bit 15 of any pixel is set to 1, then bits 8–11 are used to address an overlay look up table. Overlay color 0 is always transparent, but colors 1 to 15 can be programmed to generate any of 16.7 million possible colors. These overlays can be used to generate constant color menus and cursors, and allow the software to switch between 8 and 15 bit modes without the menus changing color. Bit 15 of the memory can be thought of as an overlay enable bit.

The DAC 27 is programmed by the computer 10 to select either the 8 or 15 bit mode, by means of a register within the device. Similarly the palette used in the 8 bit mode is also contained in registers within the DAC 27. The detection of bit 15, (which is used to enable the overlays in both modes) is performed by logic which is interfaced to 25 the overlay inputs of the DAC. When bit 15 is 0, the overlay inputs are all forced to logic level 0, whilst if bit 15 is 1, the overlay inputs are set to the level determined by bits 8–11 of the memory data.

Advanced Cathode Ray Tube Controller (ACRTC) 24

The ACRTC is a Hitachi HD63484 specialised graphics chip which can control the display on display unit 12 via programmable registers which must be initialised by the computer 10. These registers allow software to configure the ACRTC in a way that is compatible with the monitor 12 that is being used, and to select the desired display resolution. The ACRTC also initiates the refresh of memory array 22.

Whilst the ACRTC 24 is capable of performing some drawing functions very quickly, many others can be better drawn by the main processor of the computer 10. To cater for this, the memory 22 is interfaced to the ACRTC 24 in such a way that the host computer 10 can directly access the video memory 22. These direct PC accesses are controlled by a memory access arbitration chip 23 in such a manner that they never interfere with the ACRTC accesses.

Memory access arbitration unit 23

This block determines which kind of memory access will be performed if more than 1 access request occurs at any one time. The possible sources of the access can be divided into two groups, viz those initiated by the PC, and those initiated by the ACRTC. The accesses can be further subdivided as follows:

ACRTC access requests:
1. Memory refresh.
2. Video display update.
3. Graphics drawing
  PC access requests
1. Memory read/write The times at which the ACRTC performs its requests are determined in which its internal registers are programmed. However, the times at which the PC tries to access the memory cannot be as easily predicted, and some way has to be devised so that the PC and ACRTC cycles do not clash.

This is done by time slicing accesses to the memory on a 50—50 basis. The time slicing is done 2 million times a second. Using this scheme, the PC has 500 nS to access the memory, followed by 500nS for the ACRTC, 500 nS PC, 500 ACRTC etc., 500 nS is sufficient time for one PC or ACRTC access cycle to complete.

The ACRTC will, in general, not use all of its time slice periods. It will perform 2 refresh cycles, followed by 2 video display update cycles at the beginning of every line of display. It will then only try to access the memory if a drawing instruction has been issued to it. As a rule of thumb, if the ACRTC is drawing, then the PC will be waiting for the ACRTC to terminate and so will not be attempting to access the memory. Similarly, if the PC is 'drawing' in the memory, then the ACRTC will normally be idle.

In order to maximise performance, if the PC tries to access the memory during the ACRTCs time slice, and the ACRTC is idle, then the PC is allowed to access the memory, and 'hijack' the timeslice. However if the ACRTC is using its timeslice, then the PC is made to wait until its next timeslice (which will occur 500 nS later).

The timing diagram shown in FIGS. 7(a) to (d) illustrate a typical sequence of memory accesses by the ACRTC 24 and the computer 10 as controlled by memory access arbitration unit 23.

At the foot of FIG. 7, 14 time slots are shown. The even numbered time slots are assigned to the ACRTC and the odd numbered time slots are assigned to computer 10.

The events occurring in these time slots are as follows:
1) NO accesses are requested.
2) The ACRTC performs a refresh function in its timeslice. The PC requests an access, but is made to wait until the start of its next timeslice.
3) The delayed PC access from 2) is performed in the PC timeslice.
4) The ACRTC performs another refresh.
5) The PC requests, and is granted, an access within its own timeslice.
6) The ACRTC performs a display update cycle.
7) No accesses are requested.
8) The ACRTC performs a display update cycle.
9) No accesses are requested.
10) The PC requests an access within the ACRTC timeslice. Because the ACRTC is not using its timeslice, the PC access is granted without waiting for the next PC timeslice.
11) No accesses are requested.
12) The ACRTC performs a drawing cycle in response to a command issued to by the PC.
13) No accesses are requested.
14) No accesses are requested.

Referring now to FIGS. 8(a) to (c), the relationship between the display 12 (FIG. 1), the A4 scanned image by a scanner FIG. 8(d) and the A4 displayed image is illustrated. As noted above, the display of each image selected by the user is controlled by ACRTC 24 (FIG. 6).

FIG. 8 (a) shows the relationship between the display screen 12 (which is nominally of resolution 1024×768 pixels) and an A4 image 28 displayed life size and occupying a region of 528×744 pixels when measured at 64 dots per inch. The monitor 12 has a 20 inch (508 mm) screen (this dimension being measured across the diagonal) and this results in a pixel size of 1/64th of an inch (0.4 mm). Accordingly, it would be theoretically possible to scan an A4 page at a resolution of 64 dots per inch and arrive at a satisfactory display as shown in FIG. 7 (a).

In fact it is possible to scan at this resolution using a commercially available color scanner but since the maximum resolution of such a scanner is usually 300 d.p.i., scanning at a resolution which is not a submultiple of this resolution (e.g. 64 d.p.i.) involves arbitrarily discarding certain pixels of the image. This results in a degradation of the quality of the scanned image, and may for example lead to Moiré interference patterns.

Scanning at 60 d.p.i. would avoid this problem, since this resolution is 1/5th of the maximum resolution i.e. an interger submultiple. However it is preferable to scan at a slightly higher resolution and in the data retrieval system of FIG. 1 the CD's incorporate images scanned at 75 d.p.i. resolution. Such an A4 scanned image occupies a region of 619×872 pixels (approximately) as illustrated in FIG. 8 (b). Given the nominal screen resolution of 1024×768 pixels, this results in a considerable margin of the A4 image 28 which overlaps the bottom edge of the display area, as shown. Thus such a system as illustrated in FIG. 8 (b) could only display part of the height of an A4 scanned image.

In accordance with a third aspect of the invention, this problem is overcome by increasing the number of horizontal lines displayed on screen 12 from 768 to 856 as illustrated in FIG. 8 (c). This leaves a discrepancy of 872 minus 856=16 pixels in the vertical direction which can be divided into two stripes (illustrated by the cross hatched regions 28a and 28b) at the top and bottom of the A4 image which are just 8 pixels high. In practice, these marginal portions of the image contain no useful information and can therefore be omitted. However because the number of lines (pixels) in the vertical direction has been increased without a concomitant increase in the number of pixels in the horizontal direction, the aspect ratio of the image becomes distorted and in order to restore the correct aspect ratio, the monitor 12 is adjusted so as to reduce the picture width, leaving a blank region 12a (shown cross hatched). Alternatively, the number of pixels in the horizontal direction could be increased from 1024 so as to restore the correct aspect ratio.

The operation of a currently preferred embodiment of the invention (which is not intended to be limiting on the scope and utility of the invention) will now be described in detail.

For architects, consulting engineers and quantity surveyors having the most up-to-date information immediately to hand is vital. For most practices this means maintaining a product library of suppliers literature. However a traditional library has the serious disadvantage that it takes up valuable floor space and often needs the librarian's time and experience to keep it properly organised. But even the most efficient library still does not work properly because of the human factor. An article may be seen in a magazine or brochure and cut out for future reference. In a library that means that no one else can use that same information and that is not the library's only drawback. Many practices use a reference book that is issued annually. Most are limited to several hundred manufacturers references and even when new are about three months out of date. Just before a new issue arrives the publications can thus be up to fifteen months old. What usually happens is the practice gets in touch with the supplier for current information and prices. In a fast moving and competitve business environment these costs and inevitable delays are unacceptable. Despite the traditional library being inefficient and expensive until now there has not been a better alternative. This invention provides, in one embodiment, a product library specially created for architects, consulting engineers, quantity surveyors and everyone involved in the construction industry. These are updated daily, fast and easy to use, low cost and take up only three square feet of floor space; the present invention in a version to be used by the building industry is called the QUANTARC Electronic Library (QUANTARC is a trade mark of the applicants).

The QUANTARC Electronic Library contains over nine thousand manufacturers details, more than a thousand product categories and over twenty-five thousand pages of product information in color. It also includes the latest building regulations as published by Her Majesty's Stationery Office (HMSO) displayed in an easy reference format. All this information is available from this compact system. The personal computer has a 100 megabytes hard disk, a CD-ROM reader, a PC monitor and a twenty inch high resolution monitor on which the color literature is displayed. Inside the system is the autodial modem and all the communications equipment for the system updater to send automatically the latest update information and for the user to contact the manufacturers. Paper copies of the information is printed out on a high speed black and white laser printer (not shown).

Commands are given to the system by a mouse.

In operation: As soon as a user turns on the system the first screen on monitor 11 asks user to enter their name followed by their own individual pass-word as is conventional practice. Next, as shown in FIG. 9(a), a user can choose the method by which he wants to search for the information; there are four possible ways. By product catageory, by manufacturer, by trades name or by SfB classification. This menu also offers access to building regulations. All four search methods will now be described starting with product category. Firstly the screen shows user an alphabetical list of products covering the whole construction industry. If a user already knows the categories he wants to see he can type in the keyword or a few letters of that category and the system will automatically scan the product categories.

Figure 13:
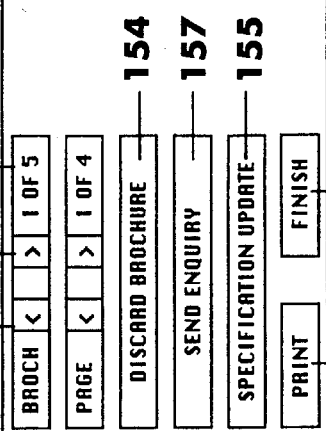
FIG. 13 shows a screen of the high resolution color monitor displaying the product information.

Starting with the alphabetical list. The mouse is used to place the cursor over the product categories user wants to look at and the button on the mouse is pressed. This marks the category. User can mark as many categories as he wishes. When all the product categories have been selected the mouse is clicked on "brochures details". The screen now only shows the product categories user wants to see (FIG. 10). Each category is followed by a list of the brochures available in that category and the manufacturer's name (FIG. 11). User can select and mark the product brochures he wants to look at using the mouse button, just as before. When user has completed his selections, user clicks on the "CD sort" at the bottom of the screen. User brochure selections will be automatically sorted by disk numbers for easy access (FIG. 12). User selects the first disk and inserts it into the reader. User clicks on "view brochures" at the bottom of the screen and page 1 of the first brochure he selected will appear on the color monitor (FIG. 13). Box 151 reminds User he is looking at the first of five brochures selected. To turn the page, User places the cursor over the page forwards or backward boxes 152, 153 and clicks the mouse. The control panel shows User how many pages there are in the brochure and which page he is looking at. The control monitor 11 will show the brochure names User is viewing and indicates the present one with a flashing cursor as indicated by the arrow in FIG. 10. At this stage User can remove the unwanted brochure from the screen using the "discard brochure" button 154. This will automatically remove the brochure and display the next. If the text on any page is especially small User can enlarge any section using a zoom control by pressing a second button on the mouse. In practice, a User will find that even 8 point text is clear and easy to read. If "specification update" 155 flashes, this means that since the page was placed on the library CD-ROM disk the manufacturer has changed the page information. It might be a change in specification, the cancellation of a product or perhaps an introduction of a new one. User places the cursor on the update button 155 and clicks the mouse. The new information is shown in the enlarged section of the screen 156. The update service is available daily, for example by the User dialling the QUANTARC Electronic Library electronic mail service and all the update information is then stored into user system's hard disk. Also, periodically, the system updater sends the User new CD disks with the updated information incorporated into the relevant pages. At the same time the amended information will also be removed from the update feature of the system.

Suppose that in spite of the details shown in the literature User needs some more information from the manufacturer. With this invention, the "send enquiry' button 157 gives User a choice of four ways to get more information. User can ask for more technical information, arrange for a representative to call, or request a price list and availability by pre-formated messages contained in a letter format. The fourth option, enables user to send a personal free form message to the manufacturer. The addressees name, address, fax number and greetings as well as the product user is enquiring about are all inserted automatically from the systems' database. Users name, company, address and telephone numbers are all included automatically. All User has to do is type in the details he wants to appear to the body of the letter. The system even adds users name and company at the bottom. The QUANTARC Electronic Library knows the User because he entered his pass-word when he started his session. Messages can be sent by fax or telex by electronic mail service. Messages can be desposited immediately or if user prefers, the system will store them for transmission during the evening when transmission costs are lower. The cursor is placed over "print" button 158 and the whole page of the brochure is laser printed on an A4 sheet.

Figure 9:
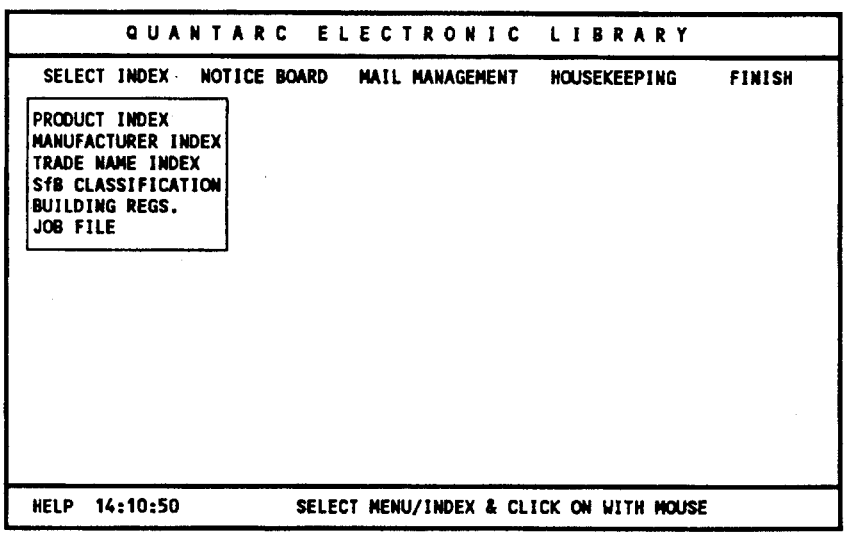
FIGS. 9 (a)–(e) show initial screens presented by the system of this invention.
Figure 9:
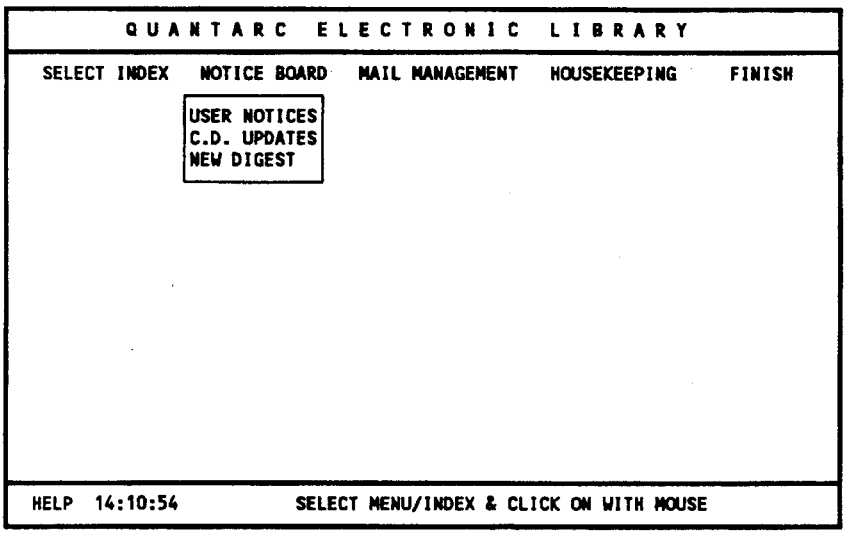
Figure 9:
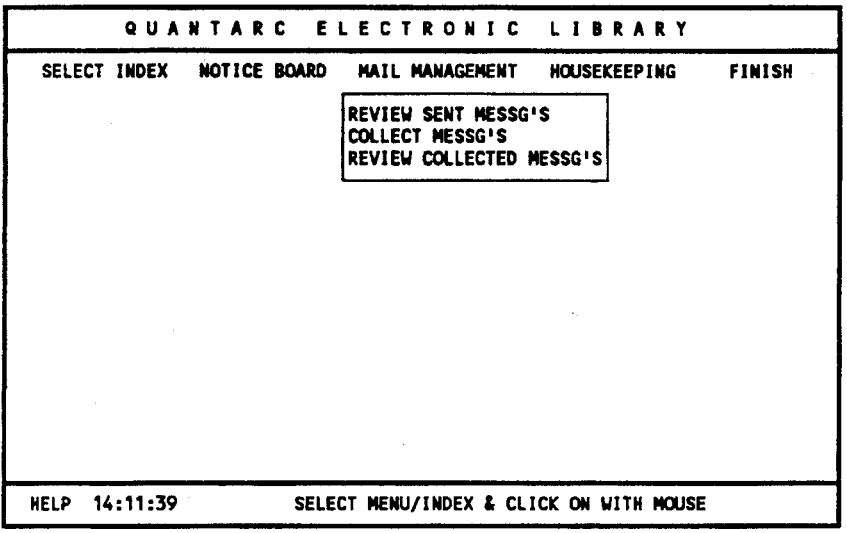
Figure 9:
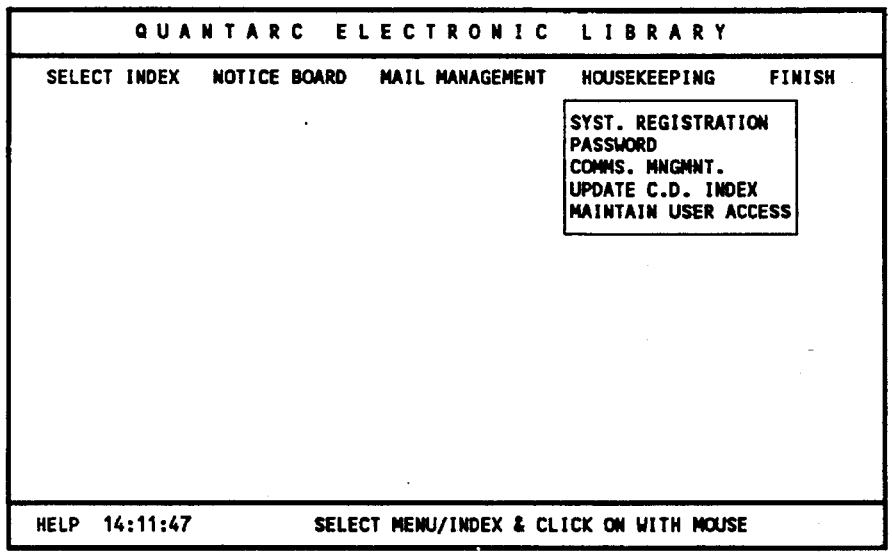
Figure 9:
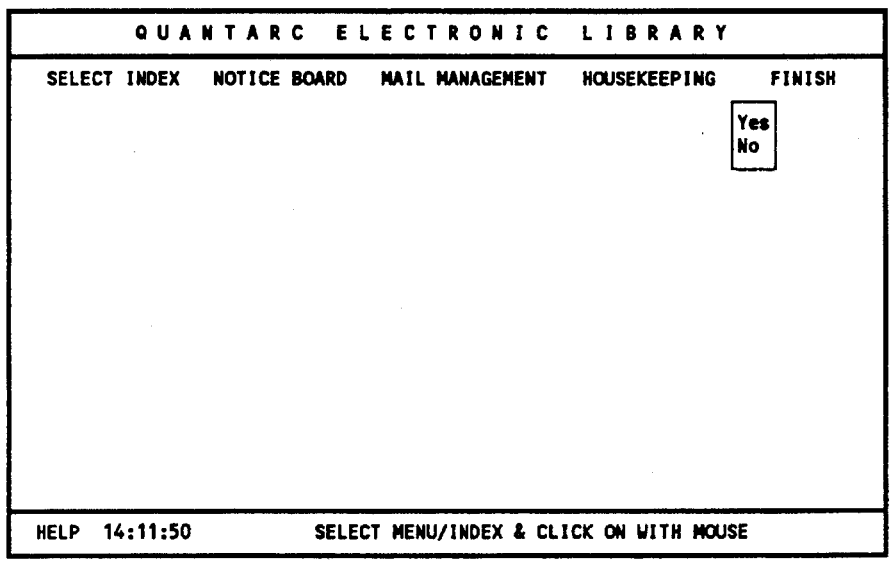

When the "finished" button 159 is pressed, the system returns to the main menu FIG. 9.

Now, the invention will be described by using the mouse to select the "manufacturer index". The invention shows user the manfuacturers in alphabetical order, one screen being shown in FIG. 14. Marking those manufacturers User wants to see, and clicking mouse on "prod dtls", and the manufacturers, their products and brochure lists are shown on the screen. Now the system will tell user which CD disk to insert. From this point, the operation is exactly the same as before. User can browse the whole pages in high definition, print them if he wishes and send messages via the enquiry system. The manufacturers' details button takes User into a comprehensive listing of the names and addresses of all the manufacturers together with their telephone and fax numbers and the name of the contact (FIG. 15). It also shows the manufacturers' product and brochure name.

The third method of searching the QUANTARC Electronic Library is by Sfb classification (FIG. 16). If User knows the Sfb classification code, he uses the keyboard search routine to find the classification he wants, marks it, then clicks on "product details" for the list of brochures and manufacturers. When User has selected those he wants to see, marks them and picks them out, the system will tell User which CD-ROM disk to insert. Once again, User has full screen, high definition and enlargeable images, updates, printing and enquiry facilities to choose from.

The fourth search method allows User to look for the information he requires using the products' trade name (FIG. 17) a feature many Users will find very useful. Once User has marked the trade names, all the features available with the other search methods can be used. The QUANTARC Electronic Library has been designed to meet the specific needs of the construction industry but as will be clear, the invention is not limited to such use and may be used for example by doctors and pharmacies requiring details of medicinal products.

Each User can build up a job file of both manufacturers and products selected for a particular contract. User marks the product selected then they are automatically saved in the job file (FIG. 18). The job file allows quick constant reference without having to go through the search procedures again. Before finishing on the system user is prompted to complete his job file. This allows user to save and print, if required, all or part of the information selected. User gives job file a client name, job number and a project name and it will be filed away until he decides to delete it. A number of job files can be created by each user and can only be accessed by that particular users pass word.

Figure 19:
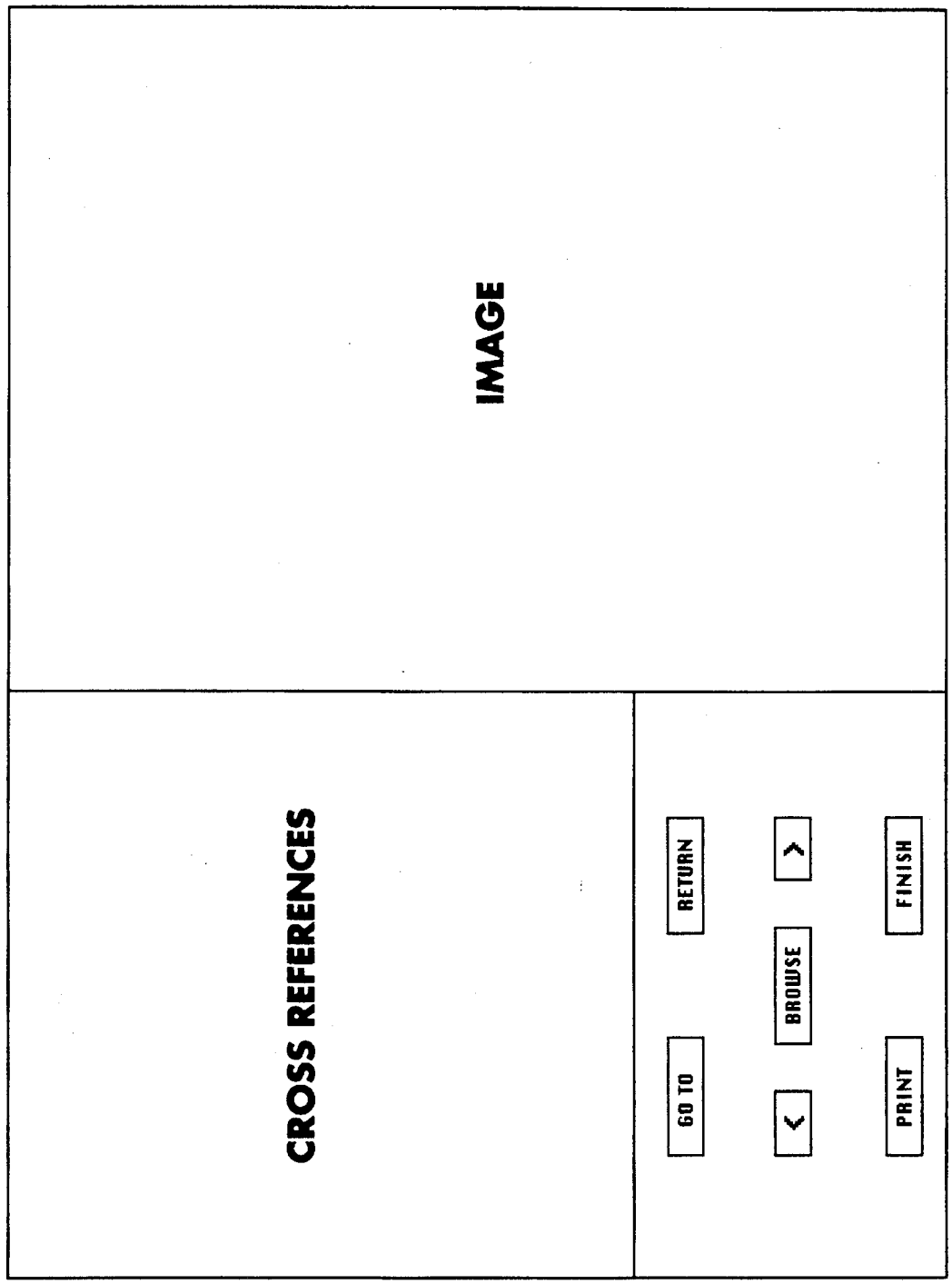
FIG. 19 shows a screen of the current building regulations.

The current building regulations from HMSO can also be searched using screen data (FIG. 19) and image data (FIG. 20). The system allows user to move quickly to the page cross references included in each section by inserting the page number required. To go back to the original page the mouse is clicked on page return.

Another useful system feature is mail management (FIG. 21), selected from the screen of FIG. 9(c)). This is a record of all messages passed to manufacturers through the system. Because it is protected by users pass word it is private.

A notice board (FIG. 9(b)) enables the publisher of the QUANTARC Electronic Library to keep user upto date with information about the QUANTARC system. It is recommended User logs on to E mail once a day just before he closes the system since the system incorporates its own dialling and communication equipment, all the up date information is transferred automatically from the central data base into users system memory, for use the next morning. In a present embodiment, the QUANTARC Electronic Library enables up to 20 users to access the systems with their own pass word. Any changes can be put into the system by a nominated manager.

Internal housekeeping can be organised using the screen of FIG. 9(d).

Finally, closing the system is performed by ejecting the CD-ROM disk, pressing finish on the main menu screen (FIG. 9(e)) and the QUANTARC Electronic Library secures all the information, messages and job files until the next day.

It is to be understood that the invention has been described with reference to exemplary embodiments and modifications may be made without departing from the spirit or scope of the invention as defined in the appended claims.

We claim:

1. An interactive data retrieval system for selectively retrieving and displaying stored visual images, comprising:

a) a recording medium having a multiplicity of visual images recorded thereon;

b) playback means arranged to access and read said visual images from said recording medium;

c) memory means containing a plurality of stored data fields, the data in at least one of said data fields identifying said visual images and the data in at least one other of said data fields being associated with said visual images;

d) database program means in association with a microprocessor for enabling a user to access data in said data fields and said visual images read by said playback means;

e) display means arranged to display under the control of said database program means, at least said visual images accessed by a user, said display means comprising means for dividing the image into square groups of adjacent pixels, means for replicating a predetermined pixel within each group by other pixels in that group to form a low resolution image composed of groups of identical adjacent pixels, means for substituting true image pixels for said other pixels in each group to form a high resolution image composed of individual pixels, and a display device responsive to said replicating means and substituting means to display an image of gradually increasing resolution; and f) an electronic data communications link between the user specified in subparagraph d) and at least one of (i) a master database source, (ii) at least one remote user, (iii) at least one supplier of products shown in said recorded visual image, and (iv) at least one supplier of information shown in said recorded visual images.

2. A data retrieval system as claimed in claim 1 wherein said memory means is arranged to store updating information received via said communications link and relating to a displayed visual image, and said display means is arranged to display said updating information in association with a visual image associated therewith.

3. A data retrieval system as claimed in claim 2 wherein said visual images recorded on said recording medium are images of pages of manufacturer's product literature.

4. A data retrieval system as claimed in claim 3 further including a high resolution color monitor for displaying high resolution color images of said pages and a monochrom monitor for displaying low resolution black and white images of the same pages, the resolution of said black and white images being sufficient for text in said product literature to be legible on said monochrome monitor.

5. A data retrieval system as claimed in claim 1 wherein said playback means, memory means, and database program means are combined in a computer having a separate stored graphics program for controlling the display of said visual images and is arranged to run the data base program of the database program means and the graphics program sequentially under the control of a user, the graphics program being arranged to display the screen last displayed by the database program means so as to provide the impression that the data base program is running concurrently with the graphics program.

6. A data retrieval system as claimed in claim 1 further comprising a computer having a graphics controller for controlling the display of textual data accessed by said database program means and having an additional dedicated graphics controller for controlling the display of said visual images, said additional graphics controller including video Random Access Memory (RAM) arranged to store a visual image read by said playback means and a dedicated microprocessor which is arranged to control the display of such a visual image stored in said video RAM.

7. A data retrieval system as claimed in claim 6 wherein said video RAM is accessible directly by the main microprocessor of said computer as well as by said dedicated microprocessor, and memory access arbitration means are provided which define respective timeslots in which said main and dedicated microprocessors can access said video RAM.

8. A data retrieval system as claimed in claim 1 wherein said recording medium is one of a digital optical and a magneto-optical recording medium.

9. A data retrieval system as claimed in claim 1 wherein said display means is arranged to display each stored visual image selected by the user with a gradually increasing resolution and means are provided for enabling the user to cancel the display of a selected visual image at a stage intermediate the initial relatively low resolution and the final relatively high resolution.

10. Apparatus for displaying a still visual image in a form of a multiplicity of pixels, comprising means for dividing the image into square groups of adjacent pixels, means for replicating a true image at one pixel within each group onto other pixels in that group to form a low resolution image composed of groups of identical adjacent pixels, means for substituting the image carried by one of said other pixels in each group with a true image for said one of said other pixels without modifying the replicated image carried by said other pixels in that group, the replicated image carried by the remaining said other pixels being replaced with a true image for each of said other pixels in a sequential manner to ultimately form a high resolution image composed of individual pixels, and display means responsive to said replicating means and substituting means to display an image of gradually increasing resolution.

11. Display apparatus as claimed in claim 10 wherein said substituting means is arranged to substitute the true image in place of a replicated image onto a predetermined one of said other image pixels in each group simultaneously.

12. Display apparatus as claimed in claim 11 wherein said substituting means is arranged to substitute a true image on a pixel in place of a replicated image carried by a pixel diagonally in line with said one pixel before substituting a true image onto a pixel for any replicated pixel which is horizontally or vertically in line with said one pixel.

13. Display apparatus as claimed in claim 11 wherein each group comprises a 2×2 array of four pixels.

14. Display apparatus as claimed in claim 10 wherein each said one pixel which is replicated within a group of pixels has the same relative position with respect to one pixel which is replicated in other groups of pixels.

15. Display apparatus as claimed in claim 10 further comprising a recording medium having said image pixel positions recorded thereon and means for reading said recorded image pixels to buffer memory, said reading means being arranged to read first said one pixel of each group which are to be replicated by the replicating means and subsequently the pixels of each group which are to be substituted by the substituting means.

16. Display apparatus as claimed in claim 15 wherein said buffer memory comprises two memory regions and said reading means is arranged to read said one pixel of each group which are to be replicated into one of said buffer memory regions and to read the pixels of each group which are to be substituted into the other of said memory regions and said replicating means and substituting means is arranged to operate on the pixels in said one or said other buffer memory region as the case may be whilst pixels are being read into said other or said one buffer memory region.

17. Apparatus as claimed in claim 10 including a digital recording medium having a visual image recorded thereon as groups of pixels, the pixels within each group being adjacent on the recording medium and spaced apart in the visual image such that each pixel belonging to a given group on the recording medium forms part of a group of adjacent pixels of the image and has a predetermined relative position with respect to the other pixels of said group of adjacent pixels of the image.

18. Apparatus for displaying a still visual image in a form of a multiplicity of pixels, comprising means for dividing the image into square groups of adjacent pixels, means for replicating a predetermined true image pixel within each group onto other pixels in that group to form a low resolution image composed of groups of identical adjacent pixels, means for substituting said other pixels in each group by true image pixels to form a high resolution image composed of individual pixels, said substituting means being arranged to substitute the true image pixel for a predetermined one of said other pixels in each group simultaneously, and display means responsive to said replicating means and substituting means to display an image of gradually increasing resolution.

19. Display apparatus as claimed in claim 18 wherein each group comprises a 2×2 array of four pixels.

20. Display apparatus as claimed in claim 18 wherein each said predetermined true image pixel which is replicated within a group has the same relative position with respect to a true image pixel which is replicated in other groups of pixels.

21. Display apparatus as claimed in claim 18 further comprising a recording medium having said image pixel positions recorded thereon and means for reading said recorded image pixels to buffer memory, said reading means being arranged to read first the predetermined true image pixels of each group which are to be replicated by the replicating means and subsequently the pixels of each group which are to be substituted by the substituting means.

22. Display apparatus as claimed in claim 21 wherein said buffer memory comprises two memory regions and said reading means is arranged to read said predetermined true image pixels of each group into one of said buffer memory regions and to read the pixels of each group which are to be substituted into the other of said memory regions and said replicating means and substituting means is arranged to operate on the pixels in said one or said other buffer memory region as the case may be whilst pixels are being read into said other or said one buffer memory region.

23. A method of recording and displaying a still visual image comprising scanning the image with a scanner, recording the scanned image on a recording medium, reading the image recorded on said recording medium and displaying the image by means of a cathode ray tube, wherein the image is scanned at an integer submultiple of a maximum resolution of the scanner, the scanned image being represented by a multiplicity of pixels, and the number of horizontal lines displayed by the cathode ray tube is selected such that there is a one-to-one correspondence between the horizontal lines and the rows of pixels generated by the scanner, and further wherein picture width and/or number of horizontal pixels displayed by the cathode ray tube is adjusted so that the aspect ratio of the displayed image is substantially the same as the aspect ratio of the scanned image.

24. Apparatus for displaying a still visual image in a form of a multiplicity of pixels, comprising means for dividing the image into square groups of adjacent pixels, means for replicating a true image at one pixel within each group onto other pixels in that group to form a low resolution image composed of groups of identical adjacent pixels, means for substituting the image carried by one of said other pixels in each group with a true image for said one of said other pixels, the replicated image carried by the remaining said other pixels being replaced with a true image for each of said other pixels in a sequential manner to ultimately form a high resolution image composed of individual pixels, said substituting means being arranged to substitute the true image in place of a replicated image onto a predetermined one of said other image pixels in each group simultaneously, and display means responsive to said replicating means and substituting means to display an image of gradually increasing resolution.

25. Display apparatus as claimed in claim 24 wherein said substituting means is arranged to substitute a true image on a pixel in place of a replicated image carried by a pixel diagonally in line with said one pixel before substituting a true image onto a pixel for any replicated pixel which is horizontally or vertically in line with said one pixel.

26. Display apparatus as claimed in claim 24 wherein each group comprises a 2×2 array of four pixels.

27. Display apparatus as claimed in claim 24 wherein each said one pixel which is replicated within a group of pixels has the same relative position with respect to one pixel which is replicated in other groups of pixels.

28. Display apparatus as claimed in claim 24 further comprising a recording medium having said image pixel positions recorded thereon and means for reading said recorded image pixels to buffer memory, said reading means being arranged to read first said one pixel of each group which are to be replicated by the replicating means and subsequently the pixels of each group which are to be substituted by the substituting means.

29. Display apparatus as claimed in claim 28 wherein said buffer memory comprises two memory regions and said reading means is arranged to read said one pixel of each group which are to be replicated into one of said buffer memory regions and to read the pixels of each group which are to be substituted into the other of said memory regions and said replicating means and substituting means is arranged to operate on the pixels in said one or said other buffer memory region as the case may be whilst pixels are being read into said other or said one buffer memory region.

\* \* \* \* \*